US010001828B2

(12) United States Patent
Chang

(10) Patent No.: US 10,001,828 B2
(45) Date of Patent: Jun. 19, 2018

(54) SIGNAL ADAPTER FOR A DISPLAY SYSTEM FOR ENERGY CONSERVATION

(71) Applicant: ATEN International Co., Ltd., New Taipei (TW)

(72) Inventor: Li-Jen Chang, New Taipei (TW)

(73) Assignee: ATEN INTERNATIONAL CO., LTD., New Taipei (TW)

(*) Notice: Subject to any disclaimer, the term of this patent is extended or adjusted under 35 U.S.C. 154(b) by 184 days.

(21) Appl. No.: 15/072,134

(22) Filed: Mar. 16, 2016

(65) Prior Publication Data
US 2017/0003726 A1   Jan. 5, 2017

(30) Foreign Application Priority Data

Jun. 30, 2015 (TW) .............................. 104210567 U

(51) Int. Cl.
*G06F 3/038* (2013.01)
*G06F 1/32* (2006.01)
*G06F 3/01* (2006.01)
*G09G 3/20* (2006.01)

(52) U.S. Cl.
CPC .......... *G06F 1/3231* (2013.01); *G06F 1/3234* (2013.01); *G06F 3/011* (2013.01); *G09G 3/2092* (2013.01); *G09G 2320/0261* (2013.01); *G09G 2330/021* (2013.01); *G09G 2330/026* (2013.01); *G09G 2330/027* (2013.01); *G09G 2330/028* (2013.01)

(58) Field of Classification Search
CPC ...... G06F 1/3231; G06F 1/3234; G06F 3/011; G09G 3/2092; G09G 2330/021; G09G 2330/026; G09G 2330/027; G09G 2330/028; G09G 2320/0261
See application file for complete search history.

(56) References Cited

U.S. PATENT DOCUMENTS

| 2008/0218493 | A1  | 9/2008  | Patten et al. |
| 2011/0246311 | A1* | 10/2011 | Chang ................ G06Q 30/02 705/14.72 |
| 2012/0064758 | A1* | 3/2012  | Grice ................. H01R 13/641 439/490 |
| 2014/0285419 | A1  | 9/2014  | Jung et al. |
| 2014/0292209 | A1* | 10/2014 | Kang ................. H05B 37/0245 315/155 |
| 2016/0044501 | A1* | 2/2016  | Libal ................. H04W 12/02 726/28 |

* cited by examiner

*Primary Examiner* — Nelson Rosario
*Assistant Examiner* — Andrew Lee
(74) *Attorney, Agent, or Firm* — Chen Yoshimura LLP

(57) ABSTRACT

A signal adapter device for a display system which enables turning on and off the display device for energy conservation. The signal adapter has a signal input port coupled to a signal source, a signal output port coupled to a display, and an adapter port coupled to a sensor. Corresponding pins of the input and output ports are electrically connected to each other, except that the hot plug detect pin of the input port is electrically disconnected from that of the output port but is electrically connected to a hot plug detect pin of the adapter port. The sensor senses environmental conditions such as the presence of viewers within a certain distance, and generates a voltage signal for the hot plug detect pin. Based on this signal on its hot plug detect pin, the signal source determines whether to transmit multimedia data to the display device.

13 Claims, 3 Drawing Sheets

SIGNAL ADAPTER FOR A DISPLAY SYSTEM FOR ENERGY CONSERVATION

BACKGROUND OF THE INVENTION

Field of the Invention

This invention relates to a display system, and in particular, it relates to a display system employing a signal adapter to enable turning on and off the display panel to achieve energy conservation.

Description of Related Art

With the development of multimedia technologies, information such as text, images, graphics, audio and video information is transmitted to display devices for display to viewers. A commonly used multimedia data transmission technology is High Definition Multimedia Interface (HDMI). HDMI is an all-digital video and audio transmission interface, which uses one cable to simultaneously transmit uncompressed audio and video data. This technology simplifies the cabling of the system and reduces installation complexity. In transmission, HDMI uses a TMDS (Transition-Minimized Differential Signaling) channel to encode video and audio data into packets, uses a DDC (Display Data Channel) channel to obtain transmission and reception capacity information of the devices, uses an CEC (Consumer Electronics Control) channel to achieve control and detection of the devices, uses a power (e.g. +5V) and GND (ground) lines to supply power, and uses the Hot Plug Detect lines to notify the source device whether the display device is connected. If it is connected, the communication sequence will start, and the source device will read the information of the receiving device via the DDC channel, and provide information regarding itself via the CEC channel, to obtain the basal state information of the receiving device, such as power supply status. HDMI is widely used in systems including computers, televisions, etc.

With the development of display devices, traditional CRTs are replaced by flat panel displays, such as LCD and plasma display devices. Flat panel displays have light weights and compact sizes. With the development in multimedia data transmission and display devices, traditional ways of disseminating information are being replaced by multimedia display systems. Multimedia display systems are now widely used in public places, such as electronic information display, billboards and other display panels.

In multimedia display systems in public places, in addition to video and audio, the display devices often have touch panel functions for users to interact with the display devices. The more function a multimedia display device provides, the more energy it consumes. Multimedia display devices in public places typically will continuously display information in order to attract viewers. However, when the viewers are few, the continuous display of the multimedia display devices can be ineffective and wasteful of energy.

SUMMARY

Accordingly, an object of the present invention is to provide a multimedia display device that both effectively disseminates information and conserves energy.

The present invention is directed to a signal adapter for a multimedia display system that achieves the above objectives.

In another aspect, the present invention is directed to a scheme of passively changing the image display state (e.g. on/off) of the display device to conserve energy.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

One embodiment of the present invention provides a display system, which includes: a signal source; a signal adapter electrically coupled to the signal source, including: a signal input port having a plurality of pins, electrically coupled to the signal source; a signal output port having a plurality of pins, the plurality of pins of the signal output port corresponding to the plurality of pins of the signal input port, wherein a hot plug detect pin of the signal input port and a hot plug detect pin of the signal output port are electrically disconnected from each other, and wherein each of the other pins of the input port is electrically connected to a corresponding one of the pints of the output port; and an adapter port, having at least a hot plug detect line electrically coupled to the hot plug detect pin of the signal input port; a sensor electrically coupled to the adapter port of the signal adapter; and a display device, coupled to the signal output port of the signal adapter, wherein when the sensor senses a predetermined external condition, it applies a first voltage signal to the hot plug detect line of the adapter port, which couples the first voltage signal to the hot plug detect pin of the signal input port, and wherein when in response to receiving the first voltage signal from the hot plug detect pin of the signal input port, the signal source transmits a multimedia data to the display device via the signal adapter to change a display state of the display device.

One embodiment of the present invention provides a display system, which including: a signal source; and a display device electrically coupled to the signal source, including: a signal adapter comprising: a signal input port having a plurality of pins, electrically coupled to the signal source; a signal output port having a plurality of pins, the plurality of pins of the signal output port corresponding to the plurality of pins of the signal input port, wherein a hot plug detect pin of the signal input port and a hot plug detect pin of the signal output port are electrically disconnected from each other, and wherein each of the other pins of the input port is electrically connected to a corresponding one of the pints of the output port; and an adapter port, having at least a hot plug detect line electrically coupled to the hot plug detect pin of the signal input port; a sensor electrically coupled to the adapter port of the signal adapter; and wherein when the sensor senses a predetermined external condition, it applies a first voltage signal to the hot plug detect line of the adapter port, which couples the first voltage signal to the hot plug detect pin of the signal input port, and wherein when in response to receiving the first voltage signal from the hot plug detect pin of the signal input port, the signal source transmits a multimedia data to the display device via the signal adapter to change a display state of the display device.

In one embodiment, the signal source is a High Definition Multimedia Interface (HDMI) signal source.

In one embodiment, the signal input port and signal output port have a plurality of HDMI pins, where the Hot Plug Detect (HPD) pins of the input and output ports are electrically disconnected.

In one embodiment, the display device is an electronic information display, billboard or other display panel.

In one embodiment, the sensor is a pyroelectric infrared radial sensor, which is low cost and small in size, and can detect infrared signals emitted by biological bodies and convert it to an output signal.

In one embodiment, the input port of the signal adapter further includes a power (+5V) pin and a ground pin, and the adapter port of the signal adapter further has a power line and a ground line which are electrically coupled to the power pin and the ground pin of the signal input port, respectively, so that the signal source supplies power to the sensor via the power line and the ground line of the adapter port.

DETAILED DESCRIPTION OF PREFERRED EMBODIMENTS

Embodiments of the present invention are described below. While implementation details are provided for the embodiments, those skilled in the relevant art will appreciate that other implementations are also possible. Further, certain details of structures and functions well known to those skilled in the art are omitted. The terms used in the descriptions below should be given broadest reasonable interpretation.

Figure 1:
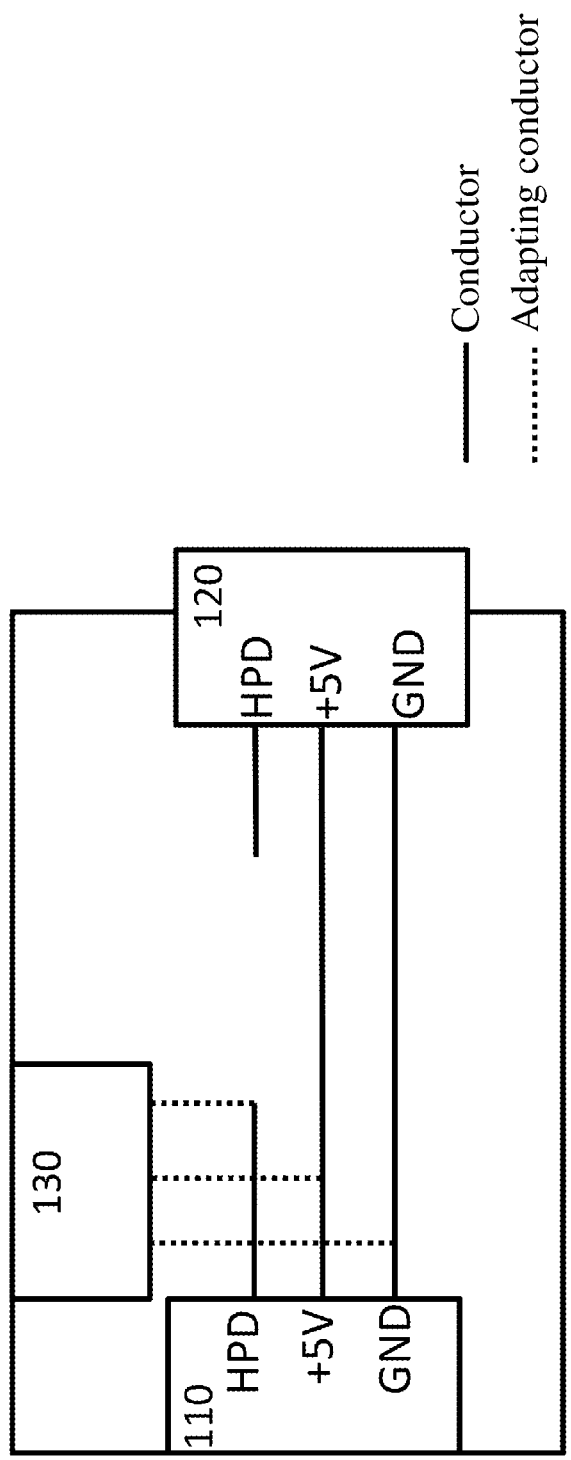
FIG. 1 schematically illustrates a signal adapter device according to an embodiment of the present invention.

As shown in FIG. 1, a signal adapter device 100 according to an embodiment of the present invention includes a signal input port 110, a signal output port 120, and an adapter port 130. The signal input port 110 has multiple input pins and the signal output port 120 has multiple corresponding output pins. Multiple corresponding conductors electrically couple the multiple input pins to the multiple corresponding output pins, except that the Hot Plug Detect (HPD) pins of the input port and the output port are electrically disconnected from each other. The adapter port 130 is electrically coupled to the signal input port 110, where the adapter port 130 has an adapter Hot Plug Detect line which is coupled to the Hot Plug Detect pin of the signal input port 110 by a conducting circuit.

The Hot Plug Detect line is a communication mechanism between devices, which is used to inform the source device as to whether a receiving device is currently connected. In one embodiment, a signal source is electrically coupled to the signal input port, a sensor is electrically coupled to the adapter port, and a display device is electrically coupled to the signal output port. When the sensor detects an external condition, it generates a charge and outputs a voltage signal on the adapter Hot Plug Detect line, which is a first voltage signal that indicates that a display device is connected. The voltage signal on the adapter Hot Plug Detect line is transmitted to the source device and causes it to start a communication sequence; for example, the source device will read information stored in the display device and search for the basal state information of the display device in order to perform data transmission.

In one embodiment, the adapter port 130 further includes a voltage (+5V) line and a ground (GND) line, respectively coupled to the voltage (+5V) and ground (GND) lines of the signal input port 110 and the signal output port 120, in order to transfer power from the signal input port 110 to the adapter port 130 to supply power to the sensor. The other pins and of the input and output ports and the conductors are not shown in FIG. 1.

Figure 2:
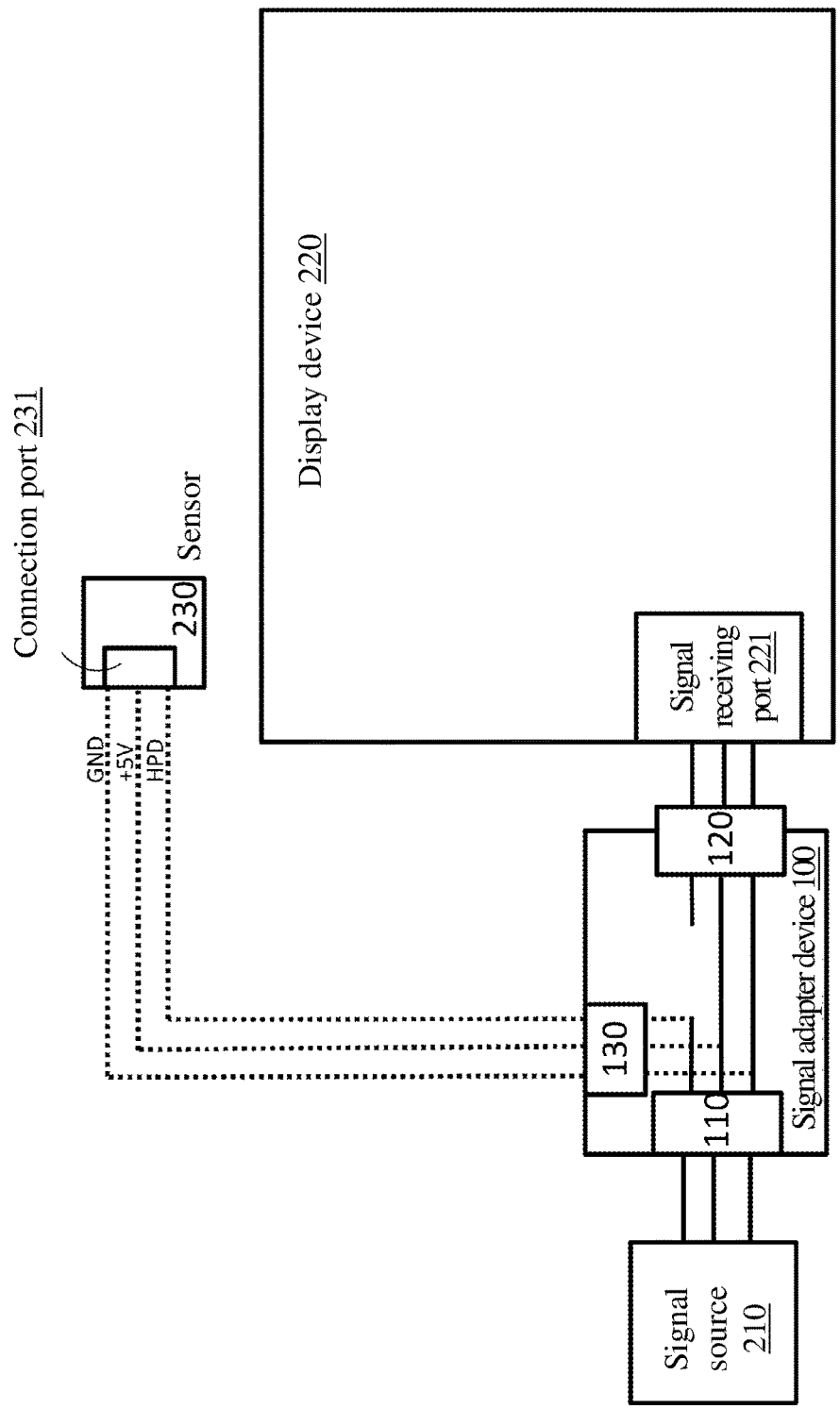
FIG. 2 schematically illustrates a display system with a signal adapter device according to an embodiment of the present invention.

As shown in FIG. 2, a display system with a signal adapter device according to an embodiment of the present invention includes a signal source 210. The signal adapter 100, identical to that shown in FIG. 1, is electrically coupled to the signal source 210 via the signal input port 110. The system also includes a display device 220, which has a signal receiving port 221 coupled to the signal output port 120 of the signal adaptor 100. The system further includes a sensor 230, which has a connection port 231 coupled to the adapter port 130 of the signal adaptor 100 by a cable.

The sensor 230 can sense an external condition, such as: when people pass by the display device, if the sensor 230 senses the presence of people within a certain detection range, it generates the first voltage signal on the Hot Plug Detect line. Through the adapter Hot Plug Detect line of the adapter 100, the signal source 210 receives this first voltage signal on its Hot Plug Detect line, which indicates to the signal source that a display device is connected. In response, the signal source 210 transmits multimedia data to the display device 220. Thus, the display device 220 passively turns on the display screen in response to receiving the data from the source device, to display the multimedia data. When the sensor does not sense the presence of people within the detection range, it outputs a second voltage signal on the Hot Plug Detect line (note that the second voltage signal may be in the form of the absence of the first voltage signal), which indicates that no display device is connected. Thus, the adapter Hot Plug Detect line is the second voltage signal, and the source device does not transmit multimedia data to the display device 220. As a result, the display device 220 does not display the data, thereby achieving energy conservation. The sensor 230 can be disposed at any physical location in relation to the display device as needed.

In one embodiment, the signal source is a High Definition Multimedia Interface (HDMI) source, HDMI devices have multiple pins, including a TMDS channel, a DDC channel, a CEC channel, +5V, GND, and Hot Plug Detect. The TMDS channel is used to transmit audio, video and other auxiliary data. The DDC channel is used to obtain capacity information of the receiving device. The CEC channel is used to transmit industry standard AV Link protocol signal to support operation of multiple AV devices using a single remote controller. The +5V and GND pins are used to supply power. The Hot Plug Detect pin is used to detect whether a receiving device is connected.

In one embodiment, the signal input port 110 and the signal output port 120 have corresponding HDMI pins, and the corresponding pins of the input and output ports are electrically coupled to each other by multiple conductors, except that the Hot Plug Detect (HPD) pins of the input port and output port are electrically disconnected from each other.

In one embodiment, the display device 220 is a digital information display, billboards or other display panel, for receiving the multimedia data from the signal source.

In one embodiment, the sensor 230 is a pyroelectric infrared radial (PIR) sensor. This type of sensors are low cost and small in size; they can detect infrared signals from humans or other biological bodies and convert them to a voltage signal as output. Here, the voltage signal is applied to the Hot Plug Detect line. By sending the voltage signal via the Hot Plug Detect line to the signal source 210, the signal source 210 determines the connection state of the device at the other end, and in response, transmits multimedia data to the display device 220.

In one embodiment, the adapter port 130 further includes a voltage (+5V) and a ground (GND) line, respectively coupled to a voltage (+5V) and a ground (GND) line between the signal input port 110 and the signal output port 120, for supplying power from the signal source 210 to the sensor 230.

Figure 3:
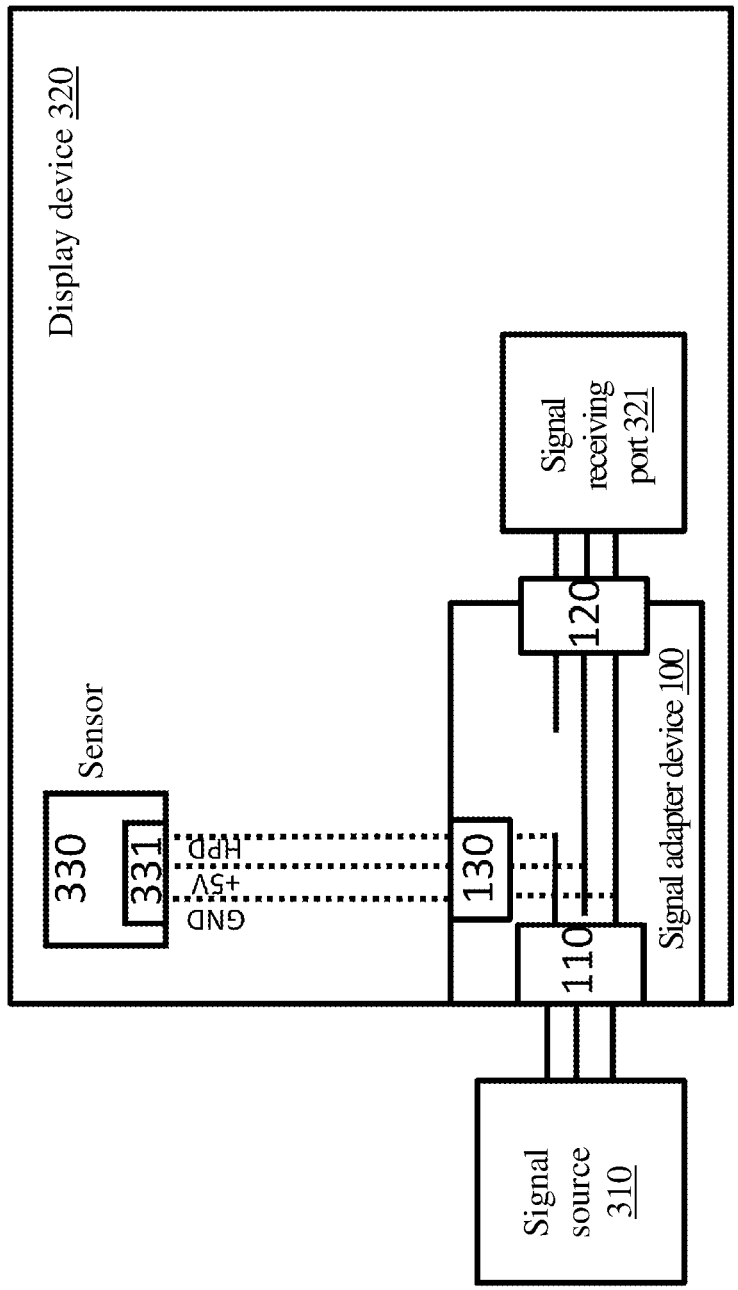
FIG. 3 schematically illustrates another display system with a signal adapter device according to another embodiment of the present invention.

As shown in FIG. 3, another display system with a signal adapter device according to another embodiment of the present invention includes a signal source 310 and a display device 320. The display device 320 internally includes a signal adapter device 100, a sensor 330 and a signal receiving port 321. The signal input port 110 of the signal adapter device 100 is electrically coupled to the signal source 310. The signal input port 110 has multiple input pins, and the signal output port 120 has corresponding multiple output pins. The multiple input pins and corresponding multiple output pins are electrically coupled to each other, except that the Hot Plug Detect (HPD) pins of the input port and the output port are electrically disconnected from each other. The signal receiving port 321 is electrically coupled to the signal output port 120, and the other components of the display device including a display panel are coupled to the signal receiving port 321. The sensor 330 includes a connector port 331, which is electrically coupled to the adapter port 130 of the signal adapter device 100 via the connector port 331. The adapter port 130 is electrically coupled to the signal input port 110; the adapter port 130 includes a Hot Plug Detect line, coupled to the Hot Plug Detect line of the signal input port 110 to form a conducting circuit.

In this embodiment, the adapter device 100 and sensor 330 and integrated in the display device 320; other aspects of the structure and function of the various components of this embodiment are similar to those of the embodiment of FIG. 2.

In another embodiment (not shown in the drawings), the adapter 100 is not required in the display system, and the signal source is directly connected to the display device. The multimedia connector port (such as an HDMI connector) of the display device is not altered, except that the circuit within the display device which is connected to the Hot Plug Detect pin of the multimedia connector port is disconnected, and the Hot Plug Detect pin is instead coupled to an output of the sensor 330. Here, ports such as ports 120, 130 and 331 shown in FIG. 3 may simply be implemented as signal conductors. The operation of such a display system is the same as described above.

Embodiments of the present invention provide an adapter device and related system and method. The method includes coupling a signal adapter device between a signal source, a sensor and a display device. Using the signal adapter device, the Hot Plug Detect line between the signal source and the sensor is in an electrically conductive state. The sensor senses an external condition, and generates a first voltage signal on the Hot Plug Detect line in response. Based on the first voltage signal on the hot plug detect line, the signal source transmits multimedia data to the display device; this changes the display state of the display device (e.g. turns on the display device). As a result, the display device is turned on only when the sensor senses the external condition (i.e. presence of viewers within a certain distance), thereby achieving energy conservation.

It will be apparent to those skilled in the art that various modification and variations can be made in the adapter and display system of the present invention without departing from the spirit or scope of the invention. Thus, it is intended that the present invention cover modifications and variations that come within the scope of the appended claims and their equivalents.

What is claimed is:

1. A signal adapter, comprising:
   a signal input port having a plurality of pins, for electrically coupling to a signal source;
   a signal output port having a plurality of pins, the plurality of pins of the signal output port corresponding to the plurality of pins of the signal input port, wherein a hot plug detect pin of the signal input port and a hot plug detect pin of the signal output port are electrically disconnected from each other while at the same time each of the other pins of the input port is electrically connected to a corresponding one of the pins of the output port; and
   an adapter port, having at least a hot plug detect line electrically coupled to the hot plug detect pin of the signal input port.

2. The signal adapter of claim 1, wherein the signal source is a High Definition Multimedia Interface (HDMI) signal source.

3. The signal adapter of claim 1, wherein the plurality of pins of the input port further includes a power pin and a ground pin, wherein the adapter port further has a power line and a ground line which are electrically coupled to the power pin and the ground pin of the signal input port, respectively.

4. A display system, comprising:
   a signal source;
   a signal adapter electrically coupled to the signal source, comprising:
      a signal input port having a plurality of pins, electrically coupled to the signal source;
      a signal output port having a plurality of pins, the plurality of pins of the signal output port corresponding to the plurality of pins of the signal input port, wherein a hot plug detect pin of the signal input port and a hot plug detect pin of the signal output port are electrically disconnected from each other, and wherein each of the other pins of the input port is electrically connected to a corresponding one of the pins of the output port; and
      an adapter port, having at least a hot plug detect line electrically coupled to the hot plug detect pin of the signal input port;
   a sensor electrically coupled to the adapter port of the signal adapter; and
   a display device, coupled to the signal output port of the signal adapter,
   wherein when the sensor senses a predetermined external condition, the sensor applies a first voltage signal to the hot plug detect line of the adapter port, which couples the first voltage signal to the hot plug detect pin of the signal input port, and
   wherein when in response to receiving the first voltage signal from the hot plug detect pin of the signal input port, the signal source transmits a multimedia data to the display device via the signal adapter to change a display state of the display device.

5. The display system of claim 4, wherein the signal source is a High Definition Multimedia Interface (HDMI) signal source.

6. The display system of claim 4, wherein the plurality of pins of the input port of the signal adapter further includes a power pin and a ground pin, wherein the adapter port of the signal adapter further has a power line and a ground line which are electrically coupled to the power pin and the ground pin of the signal input port, respectively, and wherein the signal source supplies power to the sensor via the power line and the ground line of the adapter port.

7. The display system of claim 4, wherein the sensor has a connection port which is coupled to the adapter port of the signal adapter by a cable.

8. The display system of claim 4, wherein the sensor is a pyroelectric infrared radial sensor.

9. A display system, comprising:
   a signal source; and
   a display device electrically coupled to the signal source, comprising:
      a signal adapter comprising:
         a signal input port having a plurality of pins, electrically coupled to the signal source;
         a signal output port having a plurality of pins, the plurality of pins of the signal output port corresponding to the plurality of pins of the signal input port, wherein a hot plug detect pin of the signal input port and a hot plug detect pin of the signal output port are electrically disconnected from each other, and wherein each of the other pins of the input port is electrically connected to a corresponding one of the pins of the output port; and
         an adapter port, having at least a hot plug detect line electrically coupled to the hot plug detect pin of the signal input port;
      a sensor electrically coupled to the adapter port of the signal adapter; and
      wherein when the sensor senses a predetermined external condition, the sensor applies a first voltage signal to the hot plug detect line of the adapter port, which couples the first voltage signal to the hot plug detect pin of the signal input port, and
      wherein when in response to receiving the first voltage signal from the hot plug detect pin of the signal input port, the signal source transmits a multimedia data to the display device via the signal adapter to change a display state of the display device.

10. The display system of claim 9, wherein the signal source is a High Definition Multimedia Interface (HDMI) signal source.

11. The display system of claim 9, wherein the plurality of pins of the input port of the signal adapter further includes a power pin and a ground pin, wherein the adapter port of the signal adapter further has a power line and a ground line which are electrically coupled to the power pin and the ground pin of the signal input port, respectively, and wherein the signal source supplies power to the sensor via the power line and the ground line of the adapter port.

12. The display system of claim 9, wherein the sensor has a connection port which is coupled to the adapter port of the signal adapter by a cable.

13. The display system of claim 9, wherein the sensor is a pyroelectric infrared radial sensor.

\* \* \* \* \*